United States Patent
Mraz et al.

(10) Patent No.: US 9,736,121 B2
(45) Date of Patent: Aug. 15, 2017

(54) FILE MANIFEST FILTER FOR UNIDIRECTIONAL TRANSFER OF FILES

(71) Applicant: Owl Computing Technologies, Inc., Ridgefield, CT (US)

(72) Inventors: Ronald Mraz, South Salem, NY (US); James Hope, Greenwich, CT (US)

(73) Assignee: OWL Cyber Defense Solutions, LLC, Ridgefield, CT (US)

( * ) Notice: Subject to any disclaimer, the term of this patent is extended or adjusted under 35 U.S.C. 154(b) by 110 days.

(21) Appl. No.: 13/747,771

(22) Filed: Jan. 23, 2013

(65) Prior Publication Data

US 2014/0020109 A1 Jan. 16, 2014

Related U.S. Application Data

(60) Provisional application No. 61/672,175, filed on Jul. 16, 2012.

(51) Int. Cl.
*H04L 29/06* (2006.01)

(52) U.S. Cl.
CPC ...... *H04L 63/0428* (2013.01); *H04L 63/0227* (2013.01)

(58) Field of Classification Search
CPC ............. H04L 63/0428; H04L 63/0227; H04L 63/0245; H04L 63/0263; H04L 67/06;
(Continued)

(56) References Cited

U.S. PATENT DOCUMENTS 5,638,446 A 6/1997 Rubin
5,703,562 A 12/1997 Nilsen
(Continued)

FOREIGN PATENT DOCUMENTS

EP 20457520 A2 8/2009
EP 2430548 A1 11/2010
(Continued)

OTHER PUBLICATIONS

Aspera Inc., 'Aspera Point-to-Point User Guide [Windows XP/2003/Vista/2008/7]', Version 2.5.2, Copyright 2009 © Aspera Inc., entire document, http://download.asperasoft.com/download/docs/scp_p2p/2.5/aspera_p2p_win_25.pdf.*
(Continued)

*Primary Examiner* — Luu Pham
*Assistant Examiner* — Ronald Baum
(74) *Attorney, Agent, or Firm* — Economou Silfin LLP; John S. Economou (57) ABSTRACT

A manifest transfer engine for a one-way file transfer system is disclosed. The manifest transfer engine comprises a send side, a receive side, and a one-way data link enforcing unidirectional data flow from the send side to the receive side. The send side receives and stores a file manifest table from an administrator server. The send side also receives a file from a user and compares it with the file manifest table. Transfer of the file to the receive side via the one-way data link is allowed only when there is a match between the file and the file manifest table. In an alternative embodiment, the receive side instead receives and stores the file manifest table from the administrator server and compares it with the file received from the send side via the one-way data link to determine whether to allow transfer of the file.

27 Claims, 8 Drawing Sheets

(58) Field of Classification Search
CPC ... H04L 9/3215; H04L 9/3236; H04L 9/3239; H04L 9/3242; H04L 2209/60; G06F 8/61; G06F 8/65; G06F 8/68; G06F 8/70; G06F 8/71; G06F 11/1625; G06F 21/606; G06F 21/85
USPC .......................................................... 726/26
See application file for complete search history.

(56) References Cited

U.S. PATENT DOCUMENTS

| | | | |
|---|---|---|---|
| 5,745,679 A | 4/1998 | Mercer | |
| 5,995,982 A | 11/1999 | Mercer | |
| 5,999,740 A * | 12/1999 | Rowley | 717/173 |
| 6,085,253 A * | 7/2000 | Blackwell et al. | 709/235 |
| 6,117,187 A * | 9/2000 | Staelin | G06F 8/61 717/169 |
| 6,151,708 A | 11/2000 | Pedrizetti et al. | |
| 6,243,079 B1 * | 6/2001 | Liu | G06F 3/0231 345/158 |
| 6,317,831 B1 * | 11/2001 | King | H04L 63/0428 380/223 |
| 6,331,906 B1 * | 12/2001 | Sharma | H04J 14/0212 370/222 |
| 6,381,742 B2 | 4/2002 | Forbes et al. | |
| 6,421,711 B1 * | 7/2002 | Blumenau | G06F 3/0605 709/213 |
| 6,430,608 B1 | 8/2002 | Shaio | |
| 6,694,434 B1 | 2/2004 | McGee et al. | |
| 6,789,255 B1 | 9/2004 | Pedrizetti et al. | |
| 6,883,168 B1 | 4/2005 | James et al. | |
| 6,944,634 B2 | 9/2005 | Hertling et al. | |
| 6,970,866 B1 | 11/2005 | Pravetz et al. | |
| 7,050,718 B2 * | 5/2006 | Rychlicki | H04J 14/02 398/48 |
| 7,082,615 B1 * | 7/2006 | Ellison | G06F 9/468 380/44 |
| 7,089,248 B1 | 8/2006 | King et al. | |
| 7,092,972 B2 | 8/2006 | Kashyap | |
| 7,113,484 B1 * | 9/2006 | Chapman | H04N 21/242 370/252 |
| 7,131,004 B1 * | 10/2006 | Lyle | 713/169 |
| 7,263,528 B2 | 8/2007 | Haff et al. | |
| 7,280,956 B2 | 10/2007 | Cross et al. | |
| 7,310,629 B1 | 12/2007 | Mendelson et al. | |
| 7,373,345 B2 | 5/2008 | Carpentier et al. | |
| 7,386,574 B2 | 6/2008 | Abe et al. | |
| 7,430,171 B2 * | 9/2008 | Black | H04J 3/245 370/235 |
| 7,472,272 B2 | 12/2008 | Stamos et al. | |
| 7,483,958 B1 | 1/2009 | Elabbady et al. | |
| 7,502,754 B2 | 3/2009 | Campbell et al. | |
| 7,558,797 B2 | 7/2009 | Li | |
| 7,610,355 B2 | 10/2009 | Azuma et al. | |
| 7,668,868 B1 | 2/2010 | King et al. | |
| 7,707,424 B2 | 4/2010 | Axelsson | |
| 7,756,826 B2 | 7/2010 | Bots et al. | |
| 7,765,411 B2 | 7/2010 | Hennessey et al. | |
| 7,770,222 B2 * | 8/2010 | Hopen et al. | 726/22 |
| 7,805,468 B2 | 9/2010 | Takashi | |
| 7,814,551 B2 | 10/2010 | Darweesh et al. | |
| 7,865,575 B2 | 1/2011 | Leitheiser | |
| 7,874,015 B2 | 1/2011 | Aaron | |
| 7,904,710 B2 * | 3/2011 | Rits et al. | 713/150 |
| 7,930,538 B1 | 4/2011 | Israel et al. | |
| 7,934,091 B2 | 4/2011 | Stamos et al. | |
| 7,992,209 B1 | 8/2011 | Menoher et al. | |
| 8,010,680 B2 | 8/2011 | Crawford | |
| 8,024,306 B2 | 9/2011 | Palliyil et al. | |
| 8,024,462 B1 | 9/2011 | Zhu et al. | |
| 8,041,946 B2 | 10/2011 | Bunn et al. | |
| 8,069,349 B1 | 11/2011 | Israel et al. | |
| 8,075,403 B2 | 12/2011 | O'Brien et al. | |
| 8,103,870 B2 | 1/2012 | Clower et al. | |
| 8,121,990 B1 * | 2/2012 | Chapweske | G06F 17/30174 707/695 |
| 8,161,104 B2 | 4/2012 | Tomkow | |
| 8,176,331 B2 | 5/2012 | Moreillon et al. | |
| 8,191,165 B2 | 5/2012 | Aaron | |
| 8,196,201 B2 | 6/2012 | Repasi et al. | |
| 8,234,350 B1 | 7/2012 | Gu et al. | |
| 8,250,235 B2 | 8/2012 | Harvey et al. | |
| 8,352,450 B1 | 1/2013 | Mraz et al. | |
| 8,522,249 B2 * | 8/2013 | Beaule | 718/104 |
| 8,543,824 B2 * | 9/2013 | Louch et al. | 713/176 |
| 8,943,540 B2 * | 1/2015 | Traw et al. | 725/46 |
| 9,237,126 B2 * | 1/2016 | McEvoy | H04L 63/0209 |
| 2002/0073245 A1 * | 6/2002 | Hallford | 709/331 |
| 2002/0100036 A1 * | 7/2002 | Moshir | G06F 8/62 717/173 |
| 2002/0129102 A1 * | 9/2002 | Landsman et al. | 709/203 |
| 2002/0154647 A1 * | 10/2002 | Potash | 370/412 |
| 2003/0009365 A1 * | 1/2003 | Tynan et al. | 705/9 |
| 2003/0163807 A1 * | 8/2003 | Drake | G06F 8/61 717/174 |
| 2003/0182359 A1 * | 9/2003 | Vorchik | G06F 17/30864 709/203 |
| 2004/0064693 A1 * | 4/2004 | Pabla et al. | 713/168 |
| 2004/0133548 A1 | 7/2004 | Fielding et al. | |
| 2005/0033990 A1 * | 2/2005 | Harvey | H04L 63/105 726/4 |
| 2005/0198343 A1 * | 9/2005 | Yoshimura | H04L 29/06027 709/231 |
| 2005/0246193 A1 * | 11/2005 | Roever et al. | 705/1 |
| 2006/0047974 A1 * | 3/2006 | Alpern et al. | 713/191 |
| 2006/0140226 A1 * | 6/2006 | Ho | H04J 3/08 370/539 |
| 2006/0155790 A1 * | 7/2006 | Jung | G11B 27/034 |
| 2007/0198468 A1 * | 8/2007 | Berger | 707/2 |
| 2007/0226259 A1 * | 9/2007 | Kacin | G06F 9/45512 |
| 2008/0172649 A1 * | 7/2008 | Bisso | G06F 8/65 717/121 |
| 2008/0195749 A1 * | 8/2008 | Krig | 709/232 |
| 2009/0177636 A1 * | 7/2009 | Cohn | 707/3 |
| 2009/0205026 A1 * | 8/2009 | Haff | H04L 29/06 726/5 |
| 2009/0271858 A1 | 10/2009 | Cooke et al. | |
| 2011/0154473 A1 * | 6/2011 | Anderson | G06F 21/64 726/11 |
| 2012/0030768 A1 | 2/2012 | Mraz et al. | |
| 2012/0069131 A1 * | 3/2012 | Abelow | 348/14.01 |
| 2012/0140633 A1 * | 6/2012 | Stanwood | H04L 47/2458 370/235 |
| 2012/0159468 A1 * | 6/2012 | Joshi | G06F 8/71 717/172 |
| 2012/0185692 A1 * | 7/2012 | Hamlin | H04L 9/3231 713/155 |
| 2013/0117400 A1 * | 5/2013 | An et al. | 709/206 |
| 2013/0219383 A1 * | 8/2013 | Hilerio | G06F 8/65 717/178 |
| 2015/0172348 A1 * | 6/2015 | Lohmar | H04L 65/607 709/219 |

FOREIGN PATENT DOCUMENTS

| | | |
|---|---|---|
| WO | WO2005085971 A1 | 9/2005 |
| WO | WO2010132647 A1 | 11/2010 |
| WO | WO2012012266 A1 | 1/2012 |

OTHER PUBLICATIONS

Owl Computing Technologies, '4-secure Information Security Solutions', Owl Computing Technologies, Inc., Sep. 3, 2013, entire document, http://www.infosecurityeurope.com/_novadocuments/36297?v=635137991150430000.*

UK Intellectual Property Office, Combined Search and Examination Report under Sections 17 & 18(3), Dec. 23, 2013 (includes Search Report under Section 17 dated Dec. 20, 2013).

(56) References Cited

OTHER PUBLICATIONS

UK Intellectual Property Office, Examination Report under Section18(3), Jul. 17, 2014.

* cited by examiner

FILE MANIFEST FILTER FOR UNIDIRECTIONAL TRANSFER OF FILES

CROSS-REFERENCES TO RELATED APPLICATIONS

This application claims the benefit of the filing date of U.S. provisional application Ser. No. 61/672,175, filed on Jul. 16, 2012.

FIELD OF INVENTION

The present invention relates generally to secure transfer of files. More particularly, the present invention relates to the use of one or more file manifest tables to validate files in connection with their transfer across a one-way data link.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 patent"), the content of which is hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called one-way link or one-way data link. In other words, it is physically impossible to send information or data of any kind through a one-way data link in the reverse direction. One-way data link may be hardware-based, software-based, or based on some combination of hardware and software.

Figure 1:
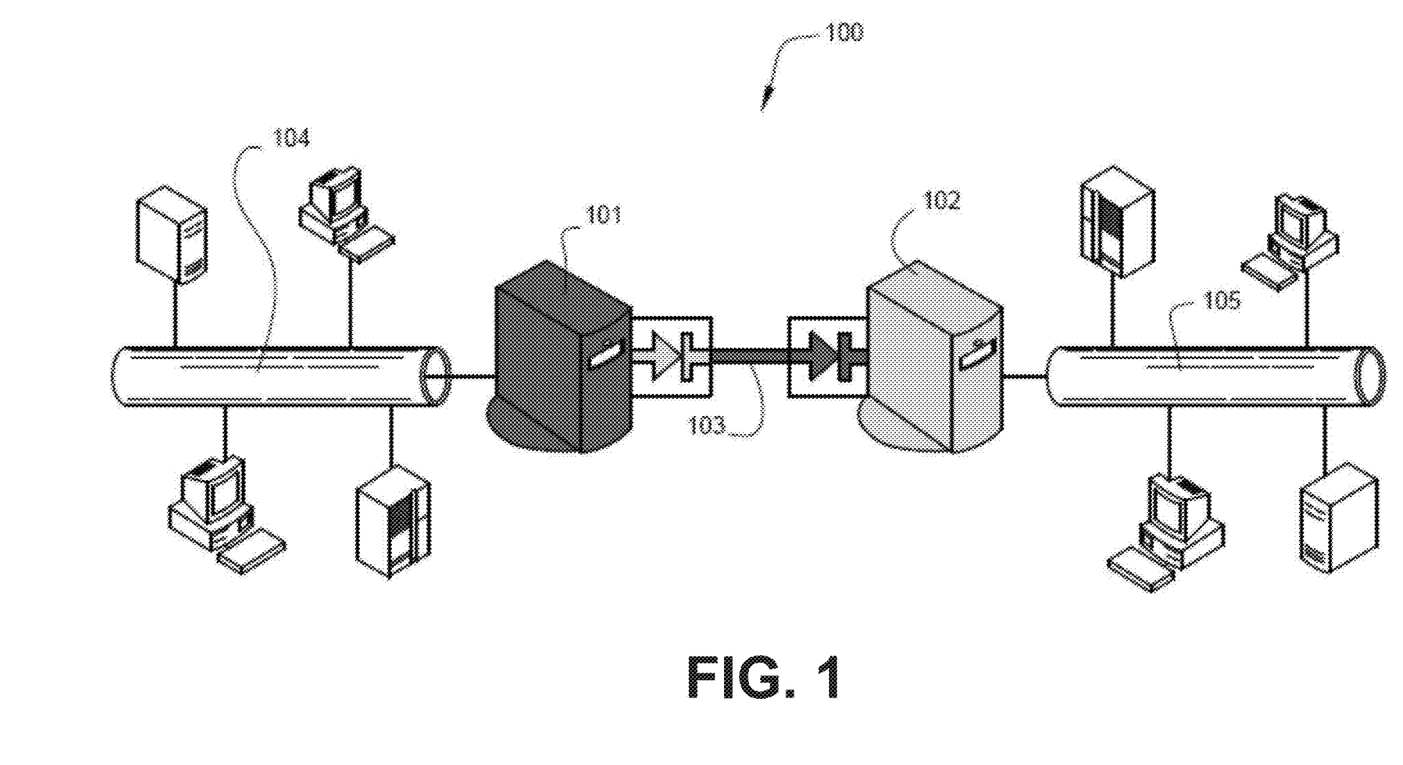
FIG. 1 schematically illustrates an example of a secure one-way data transfer system using a one-way data link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

It is an object of the present invention to enhance the security and reliability of file transfer across a one-way data link by validating files either before or after they are transferred across the one-way data link before they reach the users in the destination network.

Other objects and advantages of the present invention will become apparent from the following description.

SUMMARY OF THE INVENTION

It has now been found that the above and related objects of the present invention are obtained in the form of a file manifest filter for validating files for one-way transfer.

More particularly, the present invention relates to a manifest transfer engine comprising a send side, a one-way data link and a receive side. The send side is configured to receive and store a file manifest table having a list of file characteristics from an administrator server, to receive a file from a user and compare an identifying characteristic of the received file with the list of file characteristics in the file manifest table, and, only if there is a match between the received file characteristic and an entry in the list, to allow transfer of the file on an output. The one-way data link has an input coupled to the output of the send side and an output, and is configured to enforce unidirectional data flow only from the input to the output. The receive side has an input coupled to the output of the one-way data link and is configured to receive files via the input.

Preferably, the identifying characteristic may be a file hash value and the file manifest table may support at least one hash code algorithm selected from the group consisting of MD5 128-bit checksum, SHA 160 bit checksum, SHA 224 bit checksum, SHA 256 bit checksum, SHA 384 bit checksum, and SHA 512 bit checksum. The file manifest table may be an ASCII text file. In a further embodiment, the file manifest table may be based on hash numbers provided by the user and/or hash numbers of software updates that are publicly available. In a further embodiment, the send side may be further configured to apply a filter to the file manifest table upon receiving it from the administrator server and prior to storing it. In a further embodiment, the manifest transfer engine may further comprise a USB interface configured to transfer the user file from a USB memory device coupled to the USB interface to the send side. In a further embodiment, the send side is further configured to delete or quarantine the user file if there is no match between the received file characteristic and the list of file characteristics in the file manifest table. Preferably, the file manifest table is not accessible by the user transferring the file.

The present invention is also directed to a system for one-way transfer of files, comprising an administrator server configured to create and output a file manifest table having a list of file characteristics and a manifest transfer engine comprising a send side, a receive side, and a one-way data link enforcing unidirectional data flow from the send side to the receive side. The send side is configured to receive and store a file from a file source client, to receive and store the file manifest table, to compare an identifying characteristic of the received file with the list of file characteristics in the file manifest table, and, only if there is a match between the received file characteristic and an entry in the list of file characteristics in the file manifest table, to transfer the file to the receive side via the one-way data link. The receive side is configured to forward received files to the file destination server.

Preferably, the administrator server and the file source client are located in a same network and the send side of the manifest transfer engine receives the file manifest table from the administrator server and the file from the file source client via different dedicated TCP ports to prevent commingling of the file and the file manifest table during the transfer. In a further embodiment, the administrator server and the file source client are located on different networks. In a further embodiment, the system further comprises a second one-way data link coupled between the administrative server and the send side of the manifest engine, with the administrator server connected to an insecure network and the send side of the manifest transfer engine receives the file manifest table from the administrator server via the second one-way data link. Preferably, the insecure network is a cloud network or the Internet. In a still further embodiment, the administrative server is further configured to create and output a second file manifest table having a second list of file characteristics and the system further comprises a second manifest transfer engine comprising a second send side, a second receive side, and a second one-way data link enforcing unidirectional data flow from the second send side to the second receive side. The second send side is configured to receive and store a file from a second file source client, to receive and store the second manifest filter table, to compare an identifying characteristic of the received file with the second list of file characteristics in the second file manifest table, and, only if there is a match between the received file characteristic and an entry in the second list of file characteristics in the second file manifest table, to transfer the file to the second receive side via the second one-way data link. The second receive side is configured to forward received files to the second file destination server.

The present invention is also directed to method of file manifest filtering for file transfer across a one-way data link, comprising the steps of maintaining a file manifest table containing a list of file characteristics, receiving a file from a user, computing an identifying characteristic for the received file, comparing the computed characteristic with the list of file characteristics in the file manifest table, and transferring the file across a one-way data link only if there is a match between the computed and an entry in the list of file characteristics in the file manifest table.

The present invention is also directed to a manifest transfer engine comprising a send side, a one-way data link and a receive side. The send side is configured to receive a file from a user and transfer the user file on an output. The one-way data link has an input coupled to the output of the send side and an output, and is configured to enforce unidirectional data flow from the input to the output. The receive side has an input coupled to the output of the one-way data link and is configured to receive and store a file manifest table having a list of file characteristics from an administrator server, to receive the user file on the input and to compare an identifying characteristic of the received user file with the list of file characteristics in the file manifest table, and, only if there is a match between the received file characteristic and an entry in the list, to allow release of the received user file.

The present invention is also directed to a system for one-way transfer of files, comprising an administrator server configured to create and output a file manifest table having a list of file characteristics, and a manifest transfer engine comprising a send side, a receive side, and a one-way data link enforcing unidirectional data flow from the send side to the receive side. The send side is configured to receive a file from a file source client and forward the received file to the receive side via the one-way data link. The receive side is configured to receive and store a file from the one-way data link, to receive and store the file manifest table, to compare an identifying characteristic of the received file with the list of file characteristics in the file manifest table, and, only if there is a match between the received file characteristic and an entry in the list of file characteristics in the file manifest table, to transfer the file to a file destination server.

The present invention is also directed to a method of file manifest filtering for file transfer across a one-way data link, comprising the steps of maintaining a file manifest table containing a list of file characteristics, receiving a file from a user, transferring the file across the one-way data link, computing an identifying characteristic for the transferred file, comparing the computed characteristic with the list of file characteristics in the file manifest table, and releasing the file to a recipient only if there is a match between the computed characteristic for the transferred file and an entry in list of file characteristics in the file manifest table.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE
EXEMPLARY EMBODIMENTS

Figure 2:
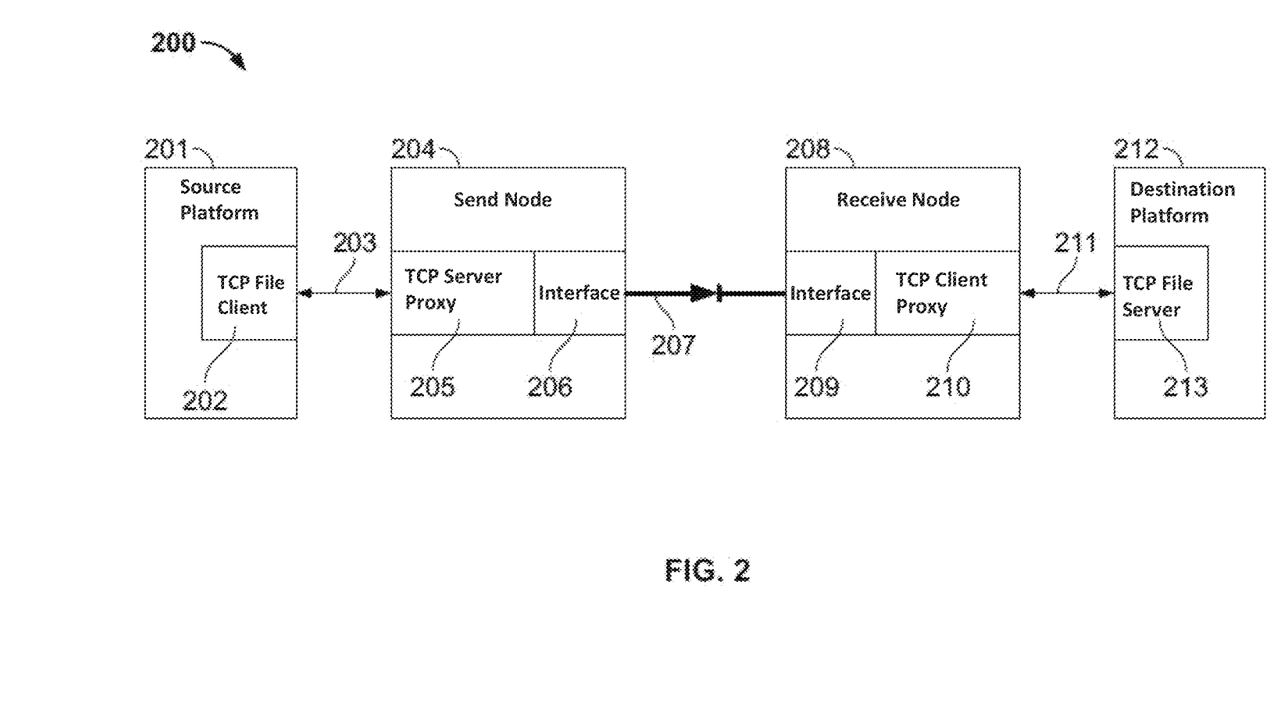
FIG. 2 is a functional block diagram that schematically illustrates TCP-based file transfer across a one-way data link.

As described in U.S. patent application Ser. No. 11/788,077, now U.S. Pat. No. 8,352,450, issued Jan. 8, 2013, the contents of which are incorporated herein by reference, files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209. Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table (e.g., Hostports.txt file) residing in the send node 204 may be different from the channel number-to-IP addressing mapping table (e.g., Portmap.txt file) residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide means for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

Figure 3A:
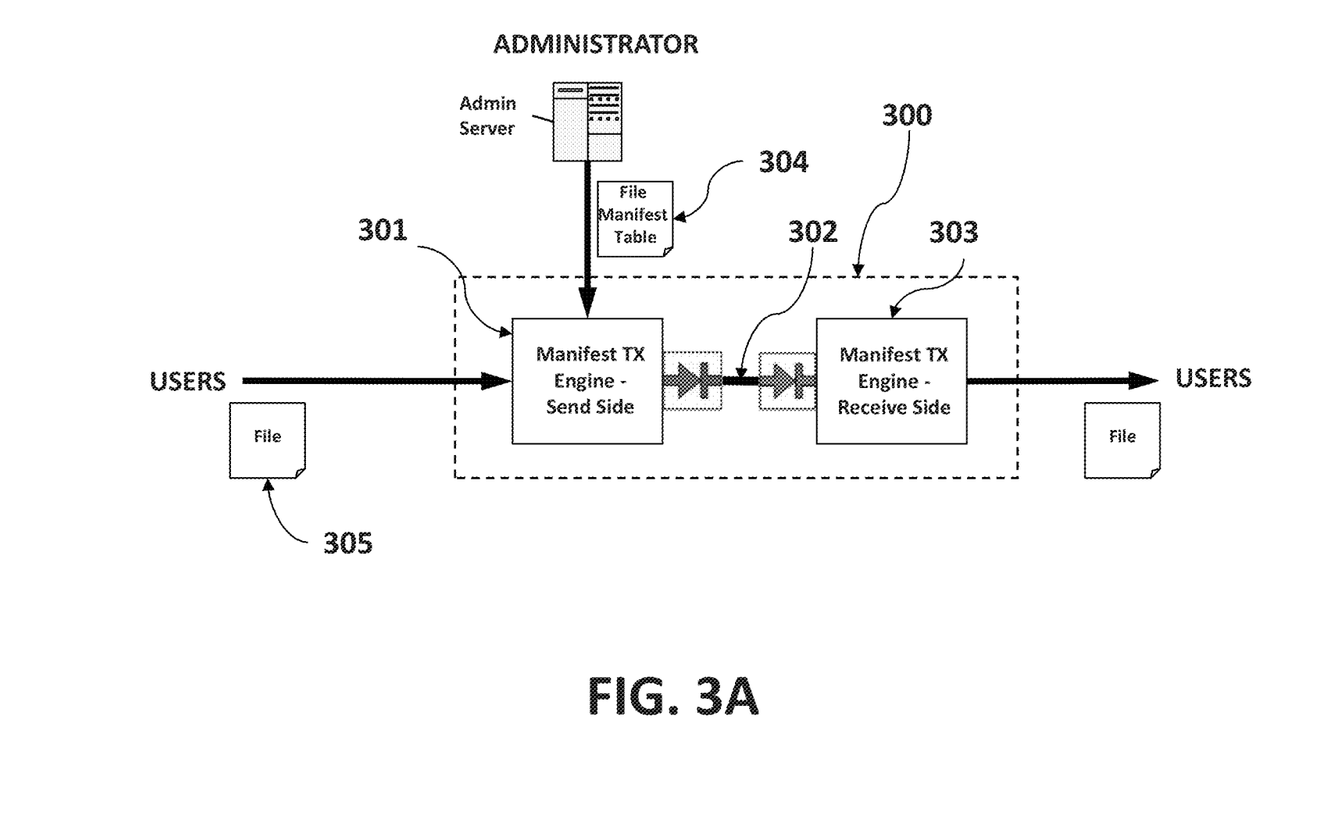
FIG. 3A is a schematic diagram of a manifest transfer engine.

FIG. 3A illustrates an exemplary embodiment of the present invention in the form of a manifest transfer engine acting as a file filtering device for securing one-way transfer of files. This addresses the need for secure and reliable transfer of potentially vulnerable files, such as executable files, OS or software application patch files, and anti-virus and anti-malware updates, across the network boundary between secure and insecure networks. For example, this may help securing automated one-way transfer of files into highly secure industrial control system (ICS) networks. The existing anti-virus filtering techniques typically prevent these otherwise valid file transfers. Hence, embodiments of the present invention may provide secure process for timely updates of OS and software patches and anti-virus/anti-malware programs, as well as suitable protection from zero-day attacks targeting highly secure networks.

As shown in FIG. 3A, the manifest transfer engine 300 may comprise a send side 301, a receive side 303, and a one-way data link 302 enforcing unidirectional data flow from the send side 301 to the receive side 303. The send side 301 of the manifest transfer engine 300 is configured to receive a file manifest table 304 from the system administrator (e.g., administrator server shown in FIG. 3A) and store it. The send side 301 is also configured to receive files 305 to be transferred across the one-way data link 302 from the user. As further described below, the send side 301 of the manifest transfer engine 300 performs the file manifest filtering by comparing the received files 305 against the file manifest table 304 received from the administrator. Only upon validation based on the file manifest table 304 stored in the send side 301, the files 305 from the user are allowed to be transferred to the receive side 303 of the manifest transfer engine 300 via one-way data link 302.

The send side 301 of the manifest transfer engine 300 may comprise a file client configured to receive files 305 from the user and send them across the one-way data link 302 upon validation. Similarly, the receive side 303 of the manifest transfer engine 300 may comprise a file server configured to receive the files from the one-way data link 302 and forward them to the intended recipient (e.g., a file server in the destination network). In one or more embodiments, the send side 301 and the receive side 303 of the manifest transfer engine 300 may respectively comprise a TCP file client 202 and a TCP file server 213 shown in FIG. 2, which are respectively configured to transfer and receive files across one-way data link 207 via specifically configured TCP server and client proxies 205, 210. In this case, upon validation of the file 305 based on the file manifest table 304, the manifest transfer engine 300 may operate in the same or similar manner as the TCP-based file transfer system 200 of FIG. 2 to transfer the file across the one-way data link 302.

In one or more embodiments, a user may transfer files to the send side 301 of the manifest transfer engine 300 from a USB memory stick. A special menu system (not shown) may allow the user to select a file from the USB file directory and copy and download (transfer) it to the send side 301 for processing and/or validation for one-way transfer. For security reason, files to be transferred from the USB memory stick to the manifest transfer engine 300 may be required to be located in a special subdirectory (e.g., "owlsenddata") of the USB memory. Unlike the USB walk-net, only the administrator-approved files may be transferred between the security domains.

In one or more embodiments, only the designated system administrator can create, edit, and/or update the file manifest table 304 at, for example, one or more administrator servers. The file manifest table is not publicly accessible and preferably remains inaccessible by any unauthorized third parties. The file manifest table could even be made inaccessible by the user of the manifest transfer engine to transfer files, depending on the desired level of security for file transfer. In one or more embodiments, suitable IP filters may be defined in a configuration file for transferring the file manifest table so as to specifically designate the personal computers or servers that are allowed to send the file manifest table to the manifest transfer engine. Preferably, the transfer of the file manifest table 304 to the send side 301 of the manifest transfer engine 300 is under a strict control of the designated system administrator.

The file manifest table may be created in the form of an ASCII-only text file ("the manifest file") containing hash numbers or other forms of identification corresponding to the files that are permitted to be transferred through one-way data link 302. For example, a manifest file may be assembled by the administrator based on the hash numbers provided by the user that correspond to the files that the user wishes to transfer across the network boundary via one-way data link 302. In another example, a manifest file may be assembled by the administrator based on the hash numbers of anti-virus and anti-malware updates and/or OS and software patches that are made publicly available from software companies.

The format of the manifest files need not be strict and may only require a list of valid hash numbers. Multiple hash code algorithms may be supported by the manifest files, including, for example, MD5 128-bit checksum (Unix: md5sum), SHA 160 bit checksum (Unix: sha1sum), SHA 224 bit checksum (Unix: sha224sum), SHA 256 bit checksum (Unix: sha256sum), SHA 384 bit checksum (Unix: sha384sum), and SHA 512 bit checksum (Unix: sha512sum). The documentation for these hash code algorithms is publicly available and once the hash program is properly installed, the manual for the hash program can be accessed by the following Unix command: "info [Unix name for the hash algorithm]" (e.g., "info md5sum").

Some examples of creating a manifest file by using the md5sum utility are described below. It is noted that the angle brackets ("< . . . >") indicate an input field and are not used during the execution. It is also noted that all the Unix utilities are executed in the same manner, producing the same resulting formatted output.

Example 1—Creating a Single Hash Entry in a File md5sum<filename> >manifest.txt

Example 2—Adding a Single Hash Number to an Existing File md5sum<filename> >>manifest.txt Example 3—Adding a List of File Hash Numbers to a File md5sum $(find<path>-type f-print)>>manifest.txt An exemplary process below illustrates the generation of a manifest file, "manifest.txt," based on Example 3:

Listing the files in subdirectory "manifest-examples":

```
manifest-examples\
    Hostports.txt
    owlSetRcvBuf
    runnetblue
    setOwlCardType
    startnetblue
```

Executing the md5sum utility on the files in the subdirectory:

md5sum $(find manifest-examples-type f-print)>>manifest.txt

The contents of the resulting manifest file "manifest.txt" are as follows:

| | |
|---|---|
| f789ff159d5023d5655ed000d63fa107 | manifest-examples/Hostports.txt |
| cc59a05c9d2b54c3e89ab4287d6d6c6a | manifest-examples/owlSetRcvBuf |
| d297da3b38f306c829653723c8c4c77f | manifest-examples/runnetblue |
| c8f6b5c6beb433d8a76547192ed7998e | manifest-examples/setOwlCardType |
| 8e64ebf9125c7257c2862e3c5ed64ca8 | manifest-examples/startnetbluexx |

In this example, the file names are included only for reference and convenience, and are not necessarily required.

In one or more embodiments, the send side 301 of the manifest transfer engine 300 is capable of accepting and storing multiple file manifest tables. In such embodiments, the administrator may send new, updated, or multiple file manifest tables to the send side 301, either periodically or at various suitable times, and the send side 301 can receive and store them without having to overwrite or delete the previously received and stored file manifest tables.

The manifest transfer engine 300 may perform the file manifest filtering as follows: The executable or non-executable file 305 received from the user by the send side 301 of the manifest transfer engine 300 is individually validated against the file manifest table 304 stored in the send side 301. In one or more embodiments, the send side 301 calculates a hash number for the received file 305 and compares it with the registered hash numbers listed on the file manifest table 304. If there is a match, the file 305 is validated and the send side 301 allows it to be transferred to the receive side 303 via one-way data link 302. On the other hand, if no match is found, the file 305 is denied transfer across one-way data link 302 and may be quarantined or deleted by the send side 301 or by the administrator. The incident of finding no match may be logged.

In one or more embodiments, a menu system associated with the manifest transfer engine may allow the system administrator to manage the file manifest tables stored in the manifest transfer engine. Management of the file manifest tables may include viewing, revising, updating and/or deleting of the file manifest tables. Preferably, users or unauthorized third parties are not allowed to access and edit the file manifest table or any individual registered hash numbers therein.

Figure 3B:
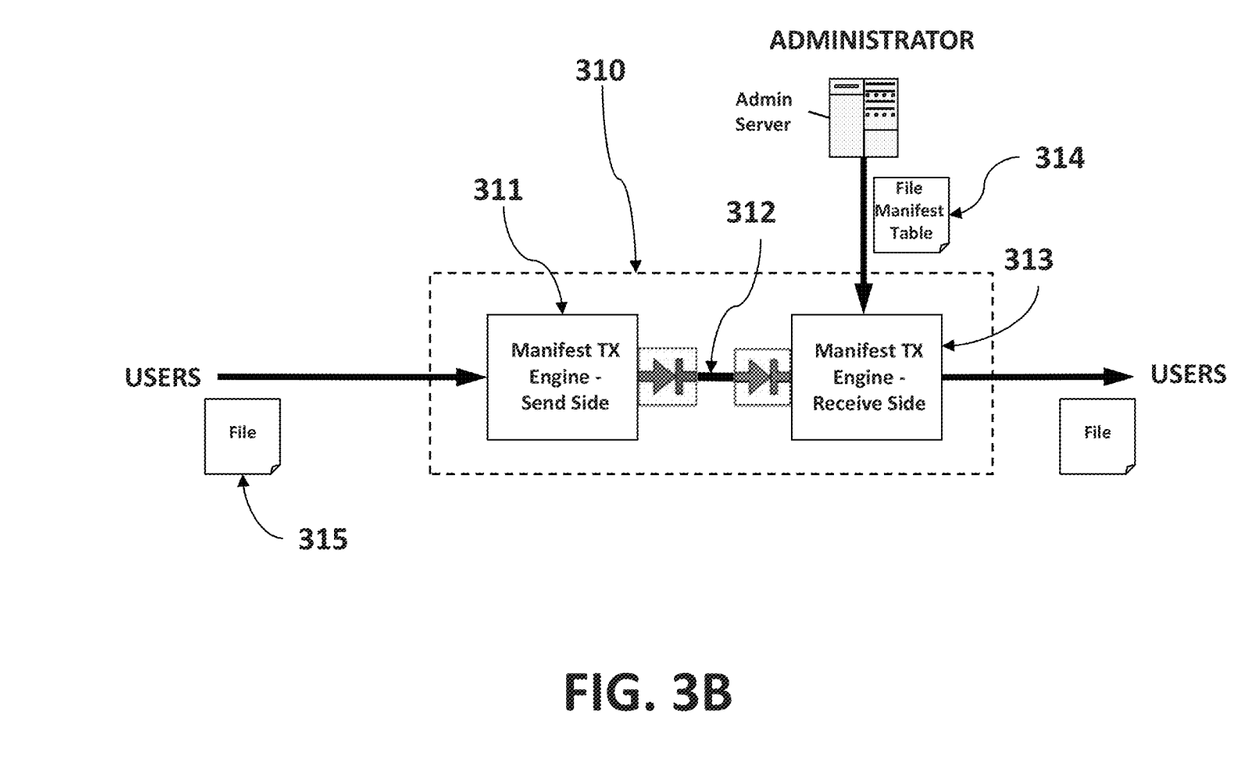
FIG. 3B illustrates an alternative embodiment of a manifest transfer engine.

FIG. 3B illustrates an alternative exemplary embodiment of the manifest transfer engine 310. The send side 311 of the manifest transfer engine 310 is configured to receive a file 315 from the user and send it to the receive side 313 via a one-way data link 312. Unlike the manifest transfer engine 300 of FIG. 3A in which the send side 301 is configured to receive and store a file manifest table from the system administrator and perform the file manifest filtering, in the manifest transfer engine 310 of FIG. 3B, the receive side 313 is configured to receive and store a file manifest table 314 and to perform the file manifest filtering by comparing the file 315 received from the one-way data link 312 against the file manifest table 314 received from the administrator. The receive side 313 may also be configured to apply a filter (e.g., ASCII filter) to the file manifest table 314 upon receiving it from the administrator server and prior to storing it. Only upon validation based on the file manifest table 314 stored in the receive side 313, the file 315 from the user is allowed to be released and forwarded to the destination. If the file fails validation based on the file manifest table 314, the receive side 313 does not release the file and may delete or quarantine the file. Except for the above described differences, other aspects of the file manifest filtering by the manifest transfer engine 310 of FIG. 3B may be same or substantially similar to those of the manifest transfer engine 300 of FIG. 3A.

As described below, the exemplary embodiments described in FIGS. 4-7 include the use of the manifest transfer engine 300 shown in FIG. 3A. However, it is noted that the exemplary embodiments shown in FIGS. 4-7 can be easily modified to use and accommodate the alternative embodiment of the manifest transfer engine 310 shown in FIG. 3B, in place of the manifest transfer engine 300 of FIG. 3A, without departing from the spirit or essential characteristics of the present invention.

Figure 4:
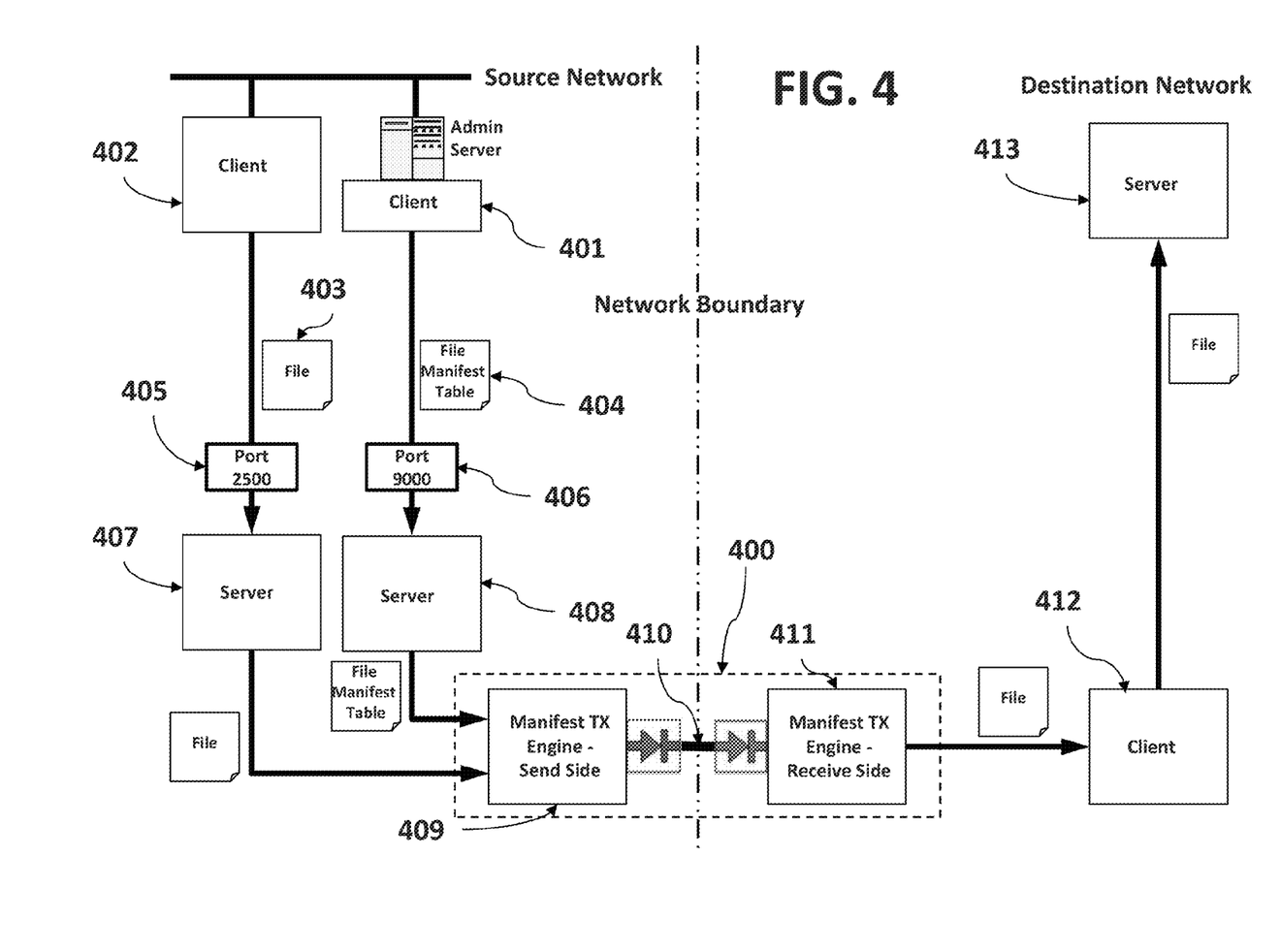
FIG. 4 is a schematic diagram of one possible network structure using a manifest transfer engine.

FIG. 4 illustrates an exemplary network structure of a one-way file transfer system employing a manifest transfer engine 400. If a file 403 is validated by the manifest transfer engine 400 based on file manifest table 404 created and provided by the administrator server (e.g., there is a match between a hash number for the file 403 and one of the registered hash numbers listed in the file manifest table 404 stored in the send side 409 of the manifest transfer engine 400), this system transfers the file 403 from a file source client 402 in a source network to file destination server 413 in a destination network across the network boundary via a one-way data link 410. On the other hand, if the file 403 fails validation (e.g., no match is found between a hash number for the file 403 and the registered hash numbers listed in the file manifest table 404 stored in the send side 409 of the manifest transfer engine 400), the manifest transfer engine 400 does not allow the file 403 to be transferred across the network boundary into the destination network.

As shown in FIG. 4, the transfer of files and file manifest tables may be performed by a secure file transfer application that enables multiple end-users to transfer files and other forms of information via TCP/IP packets to known destinations via a client-server relationship. Such file transfer application may use configurable TCP sockets for communication, transferring files, and remotely replicating entire directory structures, to and from desktops and servers. The application may also operate in conjunction with various one-way file and data transfer systems based on the use of a one-way data link, such as cross-domain solutions and electronic perimeter defense deployments, where data and file traffic is transferred between discrete networks of differing security levels.

In FIG. 4, the transfer of the file manifest table 404 and the transfer of the file 403 to the send side 409 of the manifest transfer engine 400 take place in the same network (i.e., the source network). To prevent potential commingling of the file manifest table 404 and the file 403 during the transfer, the file manifest table 404 may be transferred via a dedicated TCP port 406, which is different from the TCP port 405 over which normal file transfer is performed. As an example, FIG. 4 shows that the transfer of file 403 from client 402 to server 407 is performed over port 405 (e.g., port 2500), while the transfer of file manifest table 404 from client 401 to server 408 is performed over different port 406 (e.g., port 9000).

An exemplary processing of the file manifest table 404 is described below:

(1) A file transfer server 408 (e.g., tcpfileserver-manifest), receives the file manifest table 404 on dedicated TCP port 406 (e.g., Port 9000), using the configuration file, /Owl/owlTcpXfer/server/Hostports-file-manifest.txt This configuration file is prepared for enforcing a registered username and manifest. The user may define IP filters in the configuration file to limit the personal computers or servers that can send the file manifest tables.

(2) The received file manifest table (e.g., in the form of manifest files) is downloaded to the following subdirectory for the send side 409 of the manifest transfer engine 400:

/Owllog/manifest/download (3) owlPostProcess-manifest script monitors the subdirectory to which the file manifest table is downloaded, and applies an ASCII filter or some other suitable filter on the downloaded file manifest table to verify its integrity before moving it to:

/Owllog/manifest/filedata

If the downloaded file manifest table fails the filter, the incident is logged and the received file manifest table is deleted.

A file 403 that is transferred to the send side 409 of the manifest transfer engine 400 via TCP port 405 (e.g., Port 2500) (or alternatively, transferred using the menu driven USB interface) is validated against the registered file manifest table 404 now stored in /Owllog/manifest/filedata. For example, a hash number for the received file 403 is calculated and compared with the registered hash numbers in the file manifest table. If there is no match, the incident is logged and the received file 403 is deleted or quarantined.

If validated by the manifest transfer engine 400 based on the file manifest table 404, the file 403 is allowed to be transferred to the receive side 411 of the manifest transfer engine 400 across the network boundary via one-way data link 410. The file 403 may then be transferred to the file destination server 413 in the destination network via the corresponding client 412.

Figure 5:
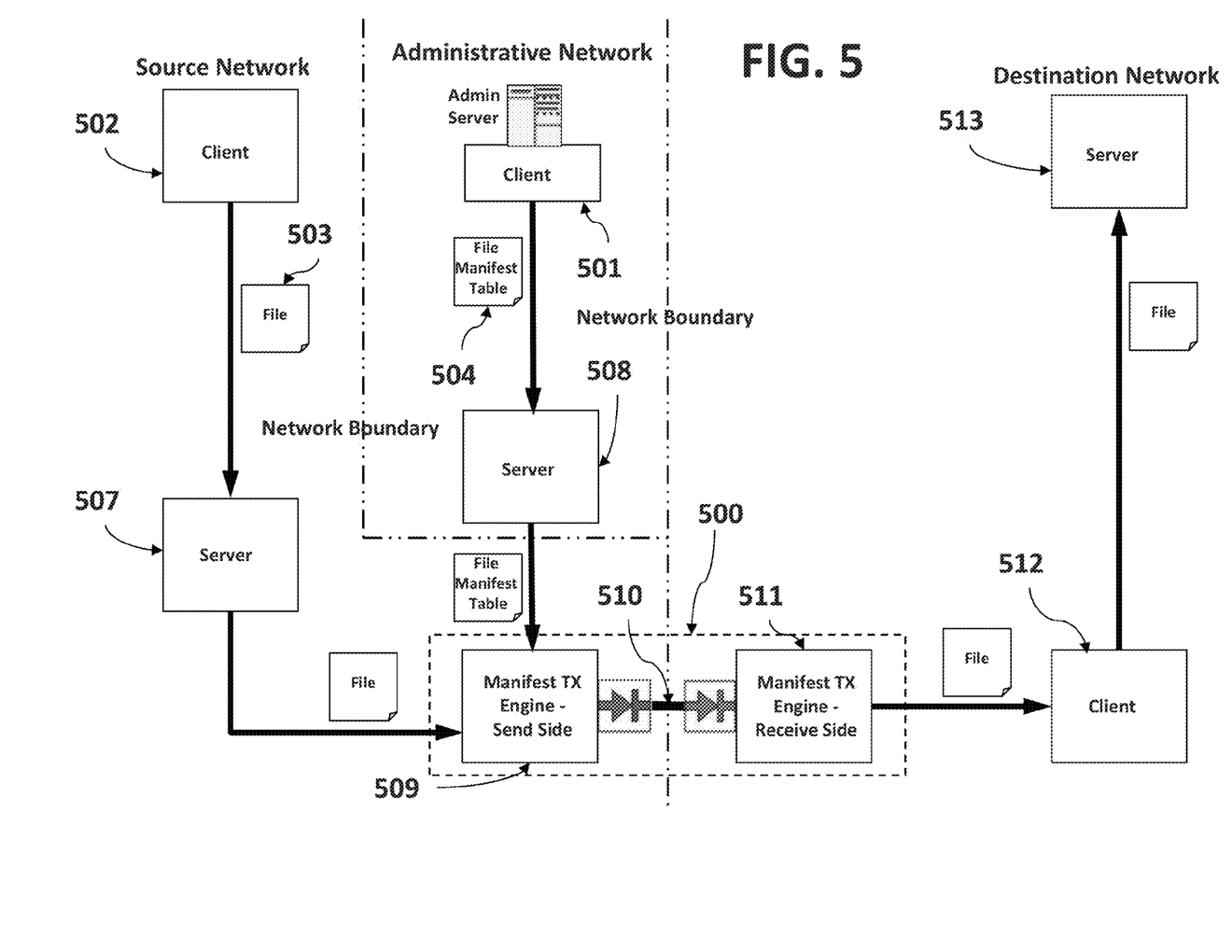
FIG. 5 is a schematic diagram of another possible network structure using a manifest transfer engine.

FIG. 5 shows another exemplary network structure of a one-way file transfer system employing a manifest transfer engine 500. Unlike the network structure in FIG. 4, in FIG. 5, the transfer of a file manifest table 504 from the system administrator (e.g., from the administrator server) and the transfer of files 503 from the user to the manifest transfer engine 500 take place in separate networks: The transfer of the files 503 from client 502 to server 507 is performed in a source network, while the transfer of the file manifest table 504 from client 501 to server 508 is performed in a separate administrative network. Accordingly, there is no need for transferring the file manifest table 504 and the files 503 to the manifest transfer engine 500 over different TCP ports to prevent commingling during the transfer.

If validated by the manifest transfer engine 500 based on the file manifest table 504, the file 503 is allowed to be transferred to the receive side 511 of the manifest transfer engine 500 via one-way data link 510. The file 503 may then be transferred to the file destination server 513 in the destination network via the corresponding client 512.

Figure 6:
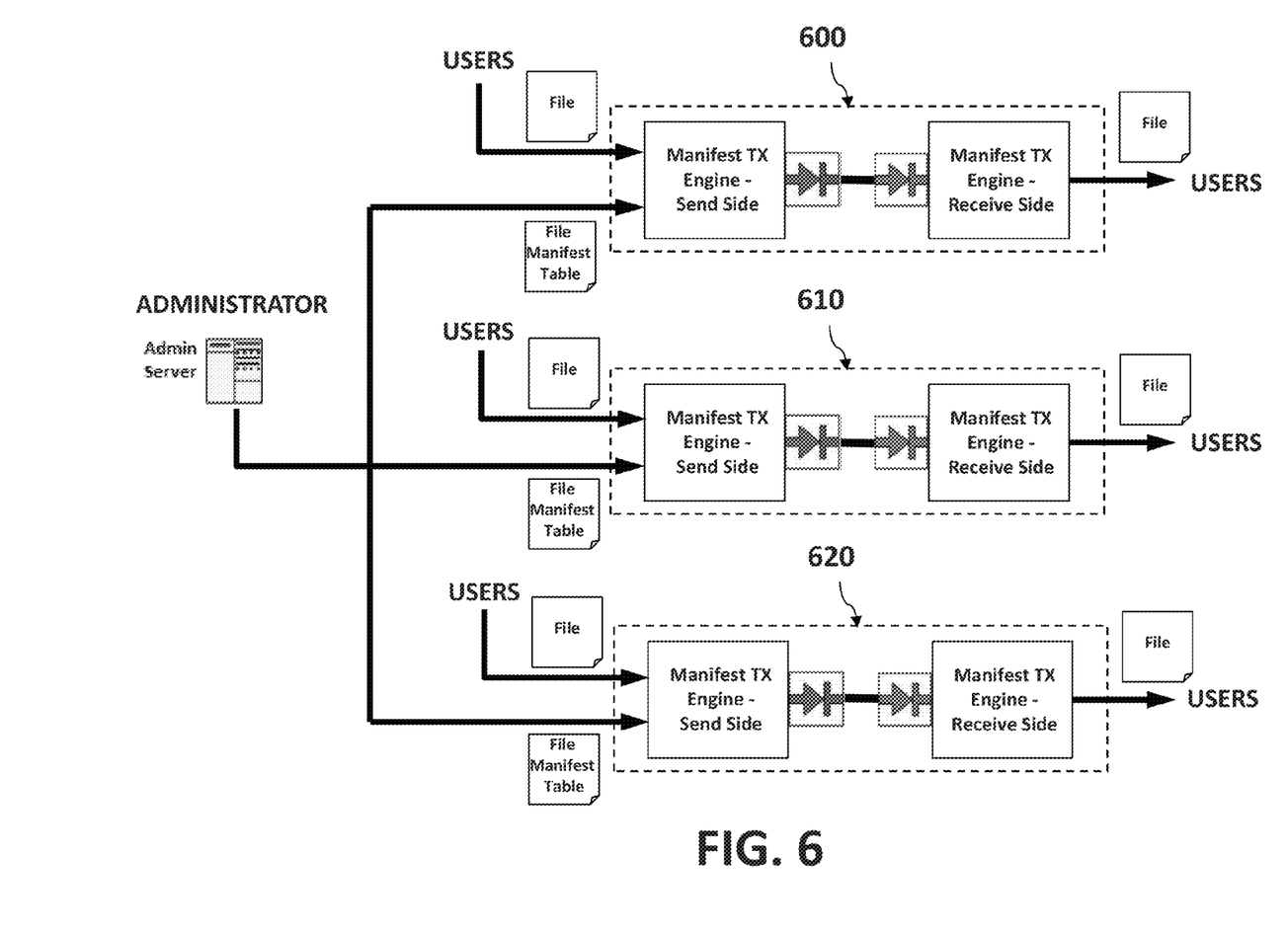
FIG. 6 is a schematic diagram of one possible network structure involving a plurality of manifest transfer engines.

FIG. 6 illustrates another exemplary implementation of manifest transfer engines. In this example, one administrative server creates and distributes file manifest tables for a plurality of manifest transfer engines 600, 610, 620. In this way, validations of one-way file transfers using the manifest transfer engines 600, 610, 620 for different domains or networks can be centrally controlled by one designated system administrator.

Figure 7:
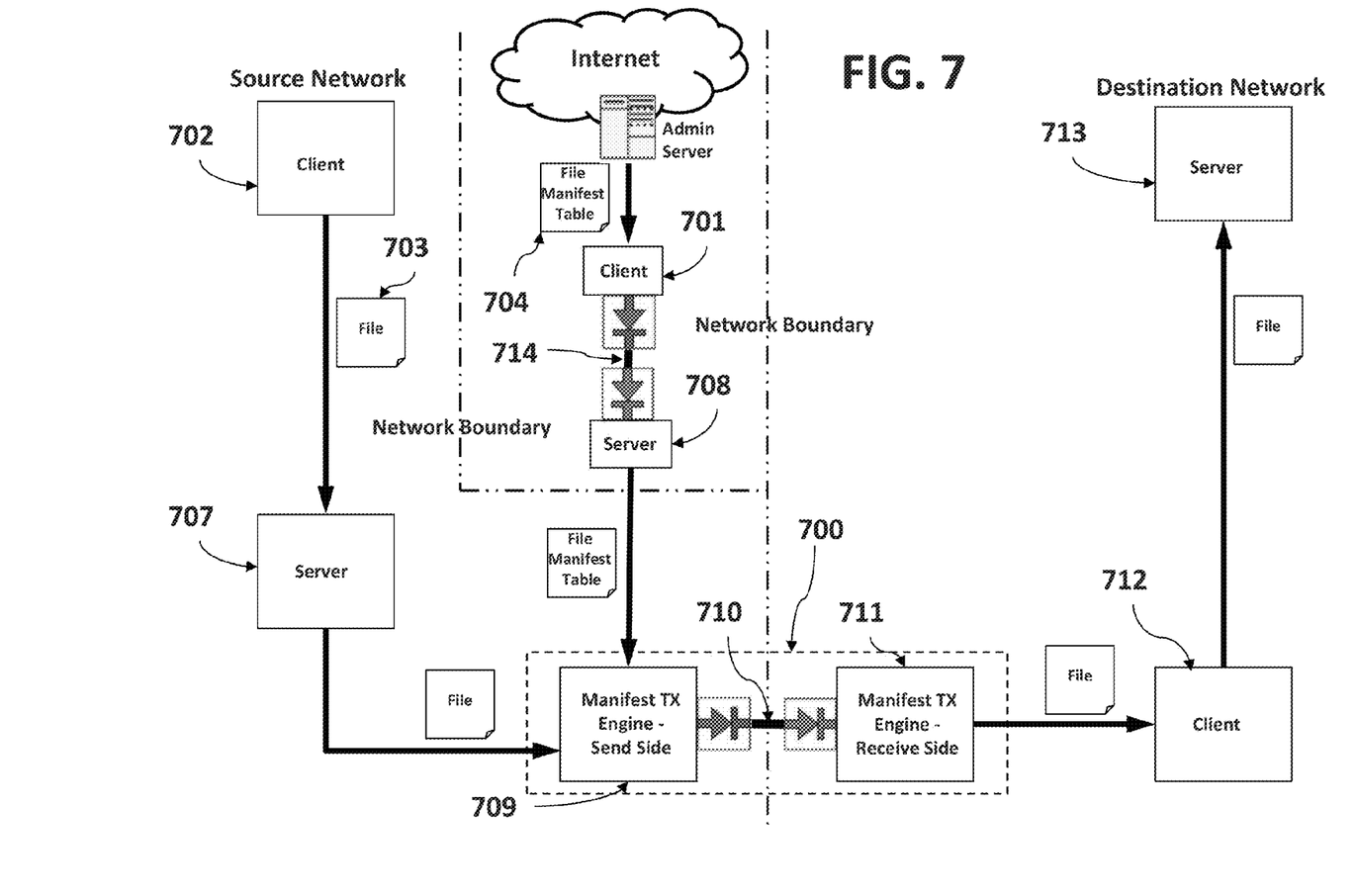
FIG. 7 is a schematic diagram of yet another network structure using a manifest transfer engine.

FIG. 7 shows yet another exemplary network structure of a one-way file transfer system employing a manifest transfer engine 700. Here, the administrator server that creates a file manifest table 704 is connected to, or located within, an insecure, open network, such as the Internet or cloud network. For example, the file manifest table is created and originated from a corporate server of an outside service that is not local to the manifest transfer engine 700. To maintain the security and integrity of the manifest transfer engine 700, the file manifest table 704 originated from the administrator server is transferred from client 701 to server 708 via a one-way data link 714 before reaching the send side 709 of the manifest transfer engine 700. In an alternative embodiment, a secure firewall protection may be used in place of the one-way data link 714 in FIG. 7. The transfer of the files 703 from client 702 to server 707 is performed in a separate source network before reaching the send side 709 of the manifest transfer engine 700.

If validated by the manifest transfer engine 700 based on the file manifest table 704, the file 703 is allowed to be transferred to the receive side 711 of the manifest transfer engine 700 via one-way data link 710. The file 703 may then be transferred to the file destination server 713 in the destination network via the corresponding client 712.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A manifest transfer engine comprising:
a send side client computer configured to receive and store a file manifest table having a list of file characteristics from an administrator server computer via a first dedicated Transmission Control Protocol (TCP) port, to receive a file from a user via a second separate dedicated TCP port and compare an identifying characteristic of the received file with the list of file characteristics in the file manifest table, and, only if there is a match between the received file characteristic and an entry in the list, to transfer the file on an output;
a one-way data link having a single input coupled to the output of the send side client computer and a single output, and configured to enforce unidirectional data flow only from the single input to the single output;
a receive side server computer having an input coupled to the single output of the one-way data link and configured to receive transferred files via the input;
wherein the send side client computer is coupled to the receive side server computer only via the one-way data link such that no data or signals can be transmitted from the receive side server computer to the send side client computer;
wherein the receive side server computer has no communications path for transmitting TCP handshake signals to the send side server computer;
wherein send side server computer removes all internet protocol information from each file prior to transfer of that file on the output;
wherein the send side client computer deletes or quarantines any received file when there is no match between the received file characteristic for that received file and the list of file characteristics in the file manifest table; and
wherein the first dedicated TCP port and the second dedicated TCP port are each the same TCP port during operation.

2. The manifest transfer engine of claim 1, wherein the file manifest table comprises a list of registered hash numbers; and wherein the send side client computer compares the received file characteristic with the list of file characteristics in the file manifest table by computing a hash number for the received file and comparing the computed hash number with the registered hash numbers in the list of file characteristics in the file manifest table.

3. The manifest transfer engine of claim 2, wherein the file manifest table supports at least one hash code algorithm selected from the group consisting of Message-Digest 5 (MD5) 128-bit checksum, Secure Hash Algorithm (SHA) 160 bit checksum, SHA 224 bit checksum, SHA 256 bit checksum, SHA 384 bit checksum, and SHA 512 bit checksum.

4. The manifest transfer engine of claim 2, wherein the file manifest table is based on hash numbers provided by the user and/or hash numbers of software updates that are publicly available.

5. The manifest transfer engine of claim 1, wherein the file manifest table is an American Standard Code for Information Interchange (ASCII) text file.

6. The manifest transfer engine of claim 1, wherein the send side client computer is further configured to apply a filter to the file manifest table upon receiving it from the administrator server computer and prior to storing it.

7. The manifest transfer engine of claim 1, further comprising a Universal Serial Bus (USB) interface configured to transfer the user file from a USB memory device coupled to the USB interface to the send side client computer.

8. The manifest transfer engine of claim 1, wherein the file manifest table is not accessible by the user transferring the file.

9. The manifest transfer engine of claim 1, wherein the one-way data link is formed from an optical transmitter having an input acting as the single input of the one-way data link and an output, an optical link having a first end coupled to the output of the optical transmitter and a second end, and an optical receiver having an input coupled to the second end of the optical link and an output acting as the single output of the one-way data link.

10. A system for one-way transfer of files, comprising:
an administrator server computer configured to create and output a file manifest table having a list of file characteristics; and
a manifest transfer engine comprising a send side client computer, a receive side server computer, and a one-way data link having a single input coupled to an output of the send side client computer and a single output coupled to an input of the receive side server computer, the one-way data link enforcing unidirectional data flow only from the single input to the single output;
wherein the send side client computer is configured to receive and store a file from a file source client, to receive and store the file manifest table, to compare an identifying characteristic of the received file with the list of file characteristics in the file manifest table, and, only if there is a match between the received file characteristic and an entry in the list of file characteristics in the file manifest table, to transfer the file to the receive side server computer via the one-way data link;
wherein the receive side server computer is configured to forward received files to a file destination server computer;
wherein the send side client computer is coupled to the receive side server computer only via the one-way data link such that no data or signals can be transmitted from the receive side server computer to the send side client computer; and
wherein the send side client computer of the manifest transfer engine receives the file manifest table from the administrator server computer via a first dedicated Transmission Control Protocol (TCP) port and the file from the file source client via a second separate dedicated TCP port;
wherein the receive side server computer has no communications path for transmitting TCP handshake signals to the send side server computer;
wherein send side server computer removes all internet protocol information from each file prior to transfer of that file on the output;
wherein the send side client computer deletes or quarantines any received file when there is no match between the received file characteristic for that received file and the list of file characteristics in the file manifest table; and
wherein the first dedicated TCP port and the second dedicated TCP port are each the same TCP port during operation.

11. The system of claim 10, wherein:
the administrator server computer and the file source client are located in a same network.

12. The system of claim 10, wherein the administrator server computer and the file source client are located on different networks.

13. The system of claim 10, further comprising a second one-way data link coupled between the administrator server computer and the send side client computer of the manifest engine; and wherein the administrator server computer is connected to an insecure network, and the send side client computer of the manifest transfer engine receives the file manifest table from the administrator server computer via the second one-way data link.

14. The system of claim 13, wherein the insecure network is a cloud network or the Internet.

15. The system of claim 10, wherein the administrator server computer is further configured to create and output a second file manifest table having a second list of file characteristics and further comprising:
a second manifest transfer engine comprising a second send side client computer, a second receive side server computer, and a second one-way data link enforcing unidirectional data flow from the second send side client computer to the second receive side server computer; and
wherein the second send side client computer is configured to receive and store a file from a second file source client, to receive and store the second manifest filter table, to compare an identifying characteristic of the received file with the second list of file characteristics in the second file manifest table, and, only if there is a match between the received file characteristic and an entry in the second list of file characteristics in the second file manifest table, to transfer the file to the second receive side server computer via the second one-way data link; and
wherein the second receive side server computer is configured to forward received files to a second file destination server computer.

16. The system of claim 10, wherein the file manifest table comprises a list of registered hash numbers; and wherein the send side client computer compares the received file characteristic with the list of file characteristics in the file manifest table by computing a hash number for the received file and comparing the computed hash number with the registered hash numbers in the list of file characteristics in the file manifest table.

17. The system of claim 16, wherein the file manifest table supports at least one hash code algorithm selected from the group consisting of Message-Digest 5 (MD5) 128-bit checksum, Secure Hash Algorithm (SHA) 160 bit checksum, SHA 224 bit checksum, SHA 256 bit checksum, SHA 384 bit checksum, and SHA 512 bit checksum.

18. The system of claim 16, wherein the file manifest table is based on hash numbers provided by the user and/or hash numbers of software updates that are publicly available.

19. The system of claim 10, wherein the file manifest table is an American Standard Code for Information Interchange (ASCII) text file.

20. The system of claim 10, wherein the send side client computer is further configured to apply a filter to the file manifest table upon receiving it from the administrator server computer and prior to storing it.

21. A method of file manifest filtering for file transfer across a one-way data link coupling a send side client computer to a receive side server computer, the one-way data link having a single input coupled to an output of the send side client computer and a single output coupled to an input of the receive side client computer, the one-way data link configured to enforce unidirectional data flow only from the single input to the single output, the send side client computer coupled to the receive side server computer only via the one-way data link, the receive side server computer having no communications path for transmitting TCP handshake signals to the send side server computer, comprising the steps of:

maintaining a file manifest table received via a first dedicated Transmission Control Protocol (TCP) port containing a list of file characteristics in the send side client computer;

receiving a file from a user in the send side client computer via a second separate dedicated TCP port;

computing an identifying characteristic for the received file in the send side client computer;

comparing the computed characteristic with the list of file characteristics in the file manifest table in the send side client computer;

only if there is a match between the computed characteristic and an entry in the list of file characteristics in the file manifest table, removing all internet protocol information from the file and transferring the file to the receive side server computer across the one-way data link;

only if there is no match between the computed characteristic and an entry in the list of file characteristics in the file manifest table, deleting or quarantining the received file in the send side client computer; and     wherein the first dedicated TCP port and the second dedicated TCP port are each the same TCP port during operation.

22. The method of claim 21, wherein the step of maintaining a file manifest table comprises:

receiving the file manifest table from an administrator server computer coupled to the send side client computer via the first dedicated TCP port;

applying a filter to the received file manifest table in the send side client computer; and     storing the received file manifest table in the send side client computer if validated by the filter.

23. The method of claim 21, wherein the step of maintaining a file manifest table comprises receiving the file manifest table from an administrator server computer via a second one-way data link.

24. The method of claim 21, wherein the computed characteristic comprises a file hash number and wherein the file manifest table supports at least one hash code algorithm selected from the group consisting of Message-Digest 5 (MD5) 128-bit checksum, Secure Hash Algorithm (SHA) 160 bit checksum, SHA 224 bit checksum, SHA 256 bit checksum, SHA 384 bit checksum, and SHA 512 bit checksum.

25. The method of claim 24, wherein the computed characteristic comprises a file hash number and wherein the file manifest table is based on hash numbers provided by the user and/or hash numbers of software updates that are publicly available.

26. The method of claim 21, wherein the file manifest table is an American Standard Code for Information Interchange (ASCII) text file.

27. The method of claim 21, wherein the step of receiving a file from a user comprises downloading the file from a Universal Serial Bus (USB) memory device.

* * * * *